United States Patent [19]

Briach, Sr.

[11] Patent Number: 4,972,588

[45] Date of Patent: Nov. 27, 1990

[54] CORDLESS DRYWALL SAW

[76] Inventor: Nicholas Briach, Sr., 682 Notre Dame Ave., Austintown, Ohio 44515

[21] Appl. No.: 442,906

[22] Filed: Nov. 29, 1989

[51] Int. Cl.[5] ............................................ B23D 45/16

[52] U.S. Cl. ......................................... 30/388; 30/505

[58] Field of Search ................. 30/388, 505, 514, 166; 128/91 A, 305

[56] References Cited

U.S. PATENT DOCUMENTS

| | | | |
|---|---|---|---|
| 1,358,866 | 11/1920 | Masland . | |
| 1,763,730 | 6/1930 | Von Lackum . | |
| 3,623,518 | 11/1971 | Nicotra . | |
| 4,084,123 | 4/1978 | Lineback et al. . | |
| 4,555,849 | 12/1985 | Ando et al. . | |
| 4,834,773 | 5/1989 | Akerberg et al. ................ | 30/388 X |

FOREIGN PATENT DOCUMENTS

| | | | |
|---|---|---|---|
| 87942 | 4/1958 | Netherlands ..................... | 128/91 A |

*Primary Examiner*—Douglas D. Watts
*Assistant Examiner*—Willmon Fridie, Jr.
*Attorney, Agent, or Firm*—Leon Gilden

[57] ABSTRACT

An apparatus is set forth for the precision aperture cutting through drywall in contemporary dwelling construction. The apparatus includes a self-contained, elongate housing defined by a rechargeable battery organization contained therewithin for selectively actuating a rotary cutting blade mounted by a rotatable shaft transversely of the housing, wherein the blade is offset relative to the housing and lies in a plane generally parallel to the axis of the housing. A modification of the instant invention includes a slidable positioning foot arrangement telescopingly receivable within a tubular sleeve for positioning the saw at a desired depth relative to the drywall and stabilizing the blade relative to the drywall surface.

3 Claims, 4 Drawing Sheets

PRIOR ART

A
10
12
15
11
13
14

15
12
20
18
16
17
14
21

CORDLESS DRYWALL SAW

BACKGROUND OF THE INVENTION

1. Field of the Invention

The field of invention relates to portable tools, and more particularly pertains to a new and improved cordless drywall saw wherein the same is selectively actuatable for precise aperture cutting within a drywall sheet.

2. Description of the Prior Art

Portable tools of various types are known in the prior art and are particularly useful in the construction industry wherein remoteness from electrical sources is typified during construction. Examples of prior art tools may be found in U.S. Pat. No. 4,084,123 to Lineback illustrating a variety of cordless electrical tools, such as a shrub trimmer, grass shears, screw drive, and the like.

U.S. Pat. No. 1,358,865 to Masland is illustrative of a typical saw wherein the saw is positioned within a recess of the housing and is associated with a conventional power supply.

U.S. Pat. No. 1,763,730 to Lackum wherein a surgical saw provided with a shaft drive includes a forwardly mounted saw positioned at a forwardmost portion of the housing.

U.S. Pat. No. 3,623,518 to Nicotra is illustrative of a portable circular saw for conventional cutting of wood and the like.

U.S. Pat. No. 4,555,849 to Ando, et al., is a further example of a conventional portable power saw utilizing a rechargeable battery to operate the power saw.

As such, it may be appreciated that there is a continuing need for a new and improved cordless drywall saw wherein the same addresses both the problems of ease of use and effectiveness in construction, and in this respect, the present invention substantially fulfills this need.

SUMMARY OF THE INVENTION

In view of the foregoing disadvantages inherent in the known types of cordless tools now present in the prior art, the present invention provides a cordless drywall saw wherein wherein the same is constructed in an axial aligned arrangement with a transversely positioned saw blade to provide an unimpeded line of sight of the saw blade in association with a drywall surface to be cut. As such, the general purpose of the present invention, which will be described subsequently in greater detail, is to provide a new and improved cordless drywall saw which has all the advantages of the prior art portable power tools and none of the disadvantages.

To attain this, the present invention essentially comprises an apparatus for the precision aperture cutting through drywall in contemporary dwelling construction. The apparatus includes a self-contained, elongate housing defined by a rechargeable battery organization contained therewithin for selectively actuating a rotary cutting blade mounted by a rotatable shaft transversely of the housing, wherein the blade is offset relative to the housing and lies in a plane generally parallel to the axis of the housing. A modification of the instant invention includes a slidable positioning foot arrangement telescopingly receivable within a tubular sleeve for positioning the saw at a desired depth relative to the drywall and stabilizing the blade relative to the drywall surface.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved cordless drywall saw which has all the advantages of the prior art drywall saws and none of the disadvantages.

It is another object of the present invention to provide a new and improved cordless drywall saw which may be easily and efficiently manufactured and marketed.

It is a further object of the present invention to provide a new and improved cordless drywall saw which is of a durable and reliable construction.

An even further object of the present invention is to provide a new and improved cordless drywall saw which is susceptible of a low cost of manufacture with regard to both materials and labor, and which accordingly is then susceptible of low prices of sale to the consuming public, thereby making such cordless drywall saw economically available to the buying public.

Still yet another object of the present invention is to provide a new and improved cordless drywall saw which provides in the apparatuses and methods of the prior art some of the advantages thereof, while simultaneously overcoming some of the disadvantages normally associated therewith.

Still another object of the present invention is to provide a new and improved cordless drywall saw wherein the same provides for an axially aligned housing provided with a spaced circular blade aligned parallel tot he housing and optionally including positioning feet spaced forwardly of the housing for alignment of the saw relative to a surface to be cut.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
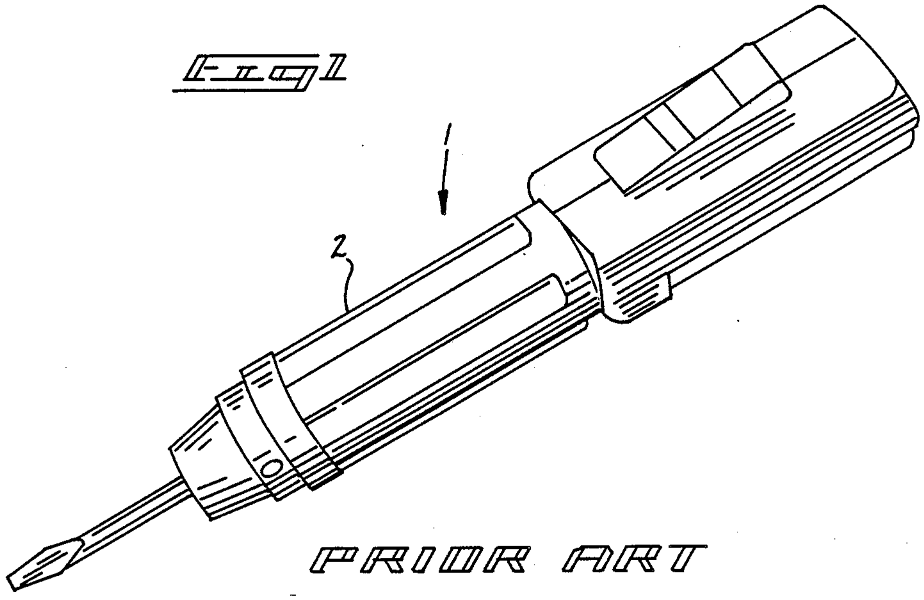
FIG. 1 is an isometric illustration of a prior art cordless power tool.

With reference now to the drawings, and in particular to FIGS. 1 to 8 thereof, a new and improved cordless drywall saw embodying the principles and concepts of the present invention and generally designated by the reference numerals 10 and **10*a*** will be described.

Figure 2:
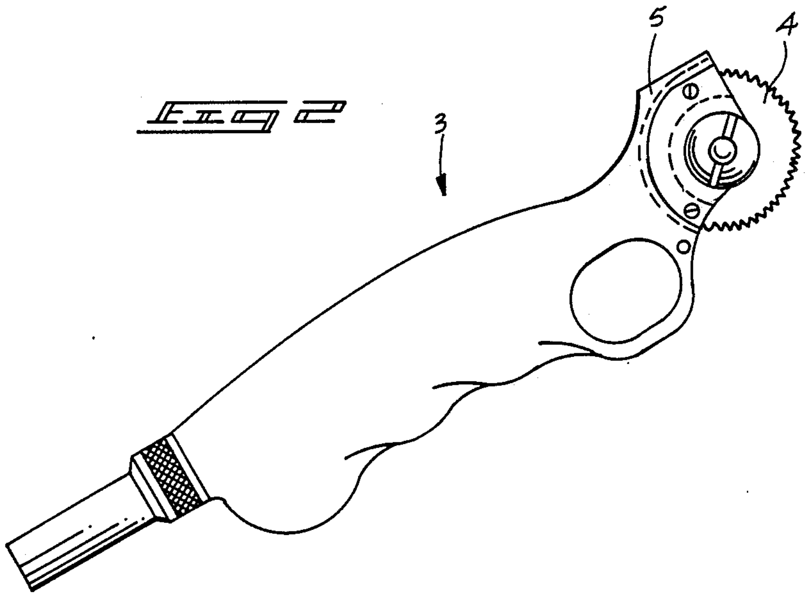
PRIOR ART FIG 2
FIG. 2 is an isometric illustration of a prior art saw device.
Figure 3:
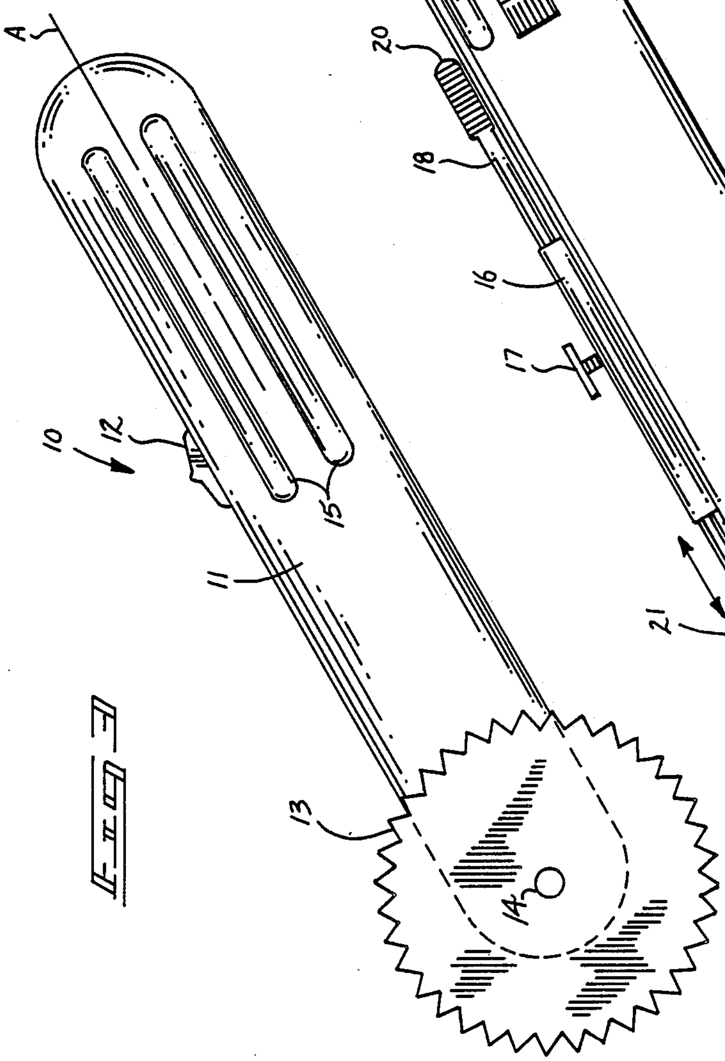
FIG. 3 is an orthographic side view taken in elevation of the instant invention.
Figure 4:
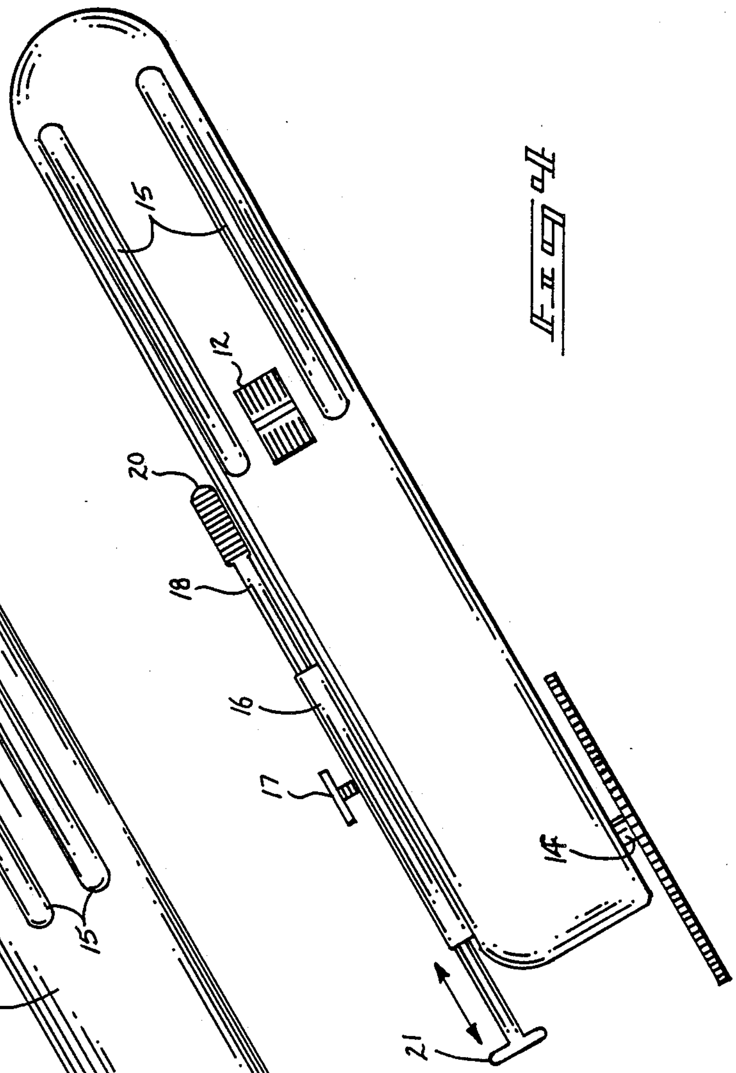
FIG. 4 is a top orthographic view of the instant invention.

The cordless tool, as illustrated in FIG. 1, is illustrative of a prior art cordless power tool 1 including an axially aligned housing 2 provided with removable screw driver bits selectively mounted to the housing coaxially thereof. The power tool is illustrated in U.S. Pat. No. 4,084,128 incorporated herein by reference to exemplify the use of a cordless power tool that is selectively rechargeable for remote use relative to conventional 110 volt alternating current electrical power. FIG. 2 illustrates a power saw 3 including a conventional drive arrangement, wherein the saw 4 is mounted at a forward end thereof positioned interiorly of a guard 5. The tool 3 is utilized particularly in surgical procedures.

Figure 5:
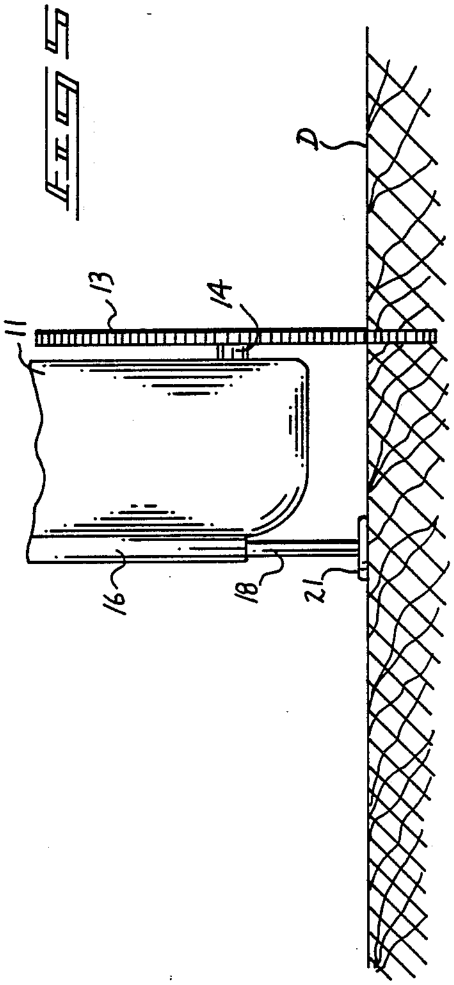
FIG. 5 is an orthographic side view taken in elevation of the instant invention in association with a workpiece.

The cordless drywall saw 10 of the instant invention essentially comprises an elongate, generally cylindrical housing 11 defined about a central axis "A" with an on/off switch 12 slidingly mounted about an exterior surface thereof. The saw includes a rotatable circular blade 18 dimensioned within parameters of two to four inches for convenience in directing the saw blade 13 into an associated drywall surface "D", as illustrated in FIG. 5 for example. The circular saw blade 13 is fixedly mounted upon a rotatable shaft 14 cooperative through an internal electric motor and the like (not shown), wherein the motor and internal drive mechanism is of conventional construction and known to those of ordinary skill in the art. A series of axially parallel grasping ribs 15 are mounted and formed to an exterior surface of the housing 11 and of a length extending from a rearward portion of the handle to a position somewhat medially of the housing 11 to provide an enhanced grasping surface for an individual.

A tubular sleeve 16 is fixedly mounted to an interior surface of the housing adjacent a forwardmost end thereof and is aligned parallel to the axis "A" of the housing 11. The sleeve 16 slidably receives an elongate smooth rod 18 therethrough, wherein the rod 18 is formed with a rearwardly positioned serrated, enlarged end 20 to prevent the rod 18 from being removed from the sleeve 16, with a forwardmost end of the rod 18 formed with an angular foot member 21 orthogonally positioned relative to the rod 18. It should be noted that the sleeve 16 is positioned integrally mounted to an exterior surface of the housing 11 diametrically opposed to the positioning of the drive shaft 14 where it extends exteriorly of the housing 11 to enable positioning of the forward foot 21 against a drywall surface "D" and thereby permits pivotment of the housing about the foot 21 in engaging the saw 13 with the drywall "D". The foot member 21 is positioned as a saw blade 13 in use and further controls a depth of cut of the blade 13 relative to a sheet of drywall "D", as illustrated in FIG. 5 for example. A threaded abutment member 17 is orthogonally and threadedly mounted through the sleeve 16 to secure the rod 18 in a preselected position relative to the sleeve 16.

Figure 6:
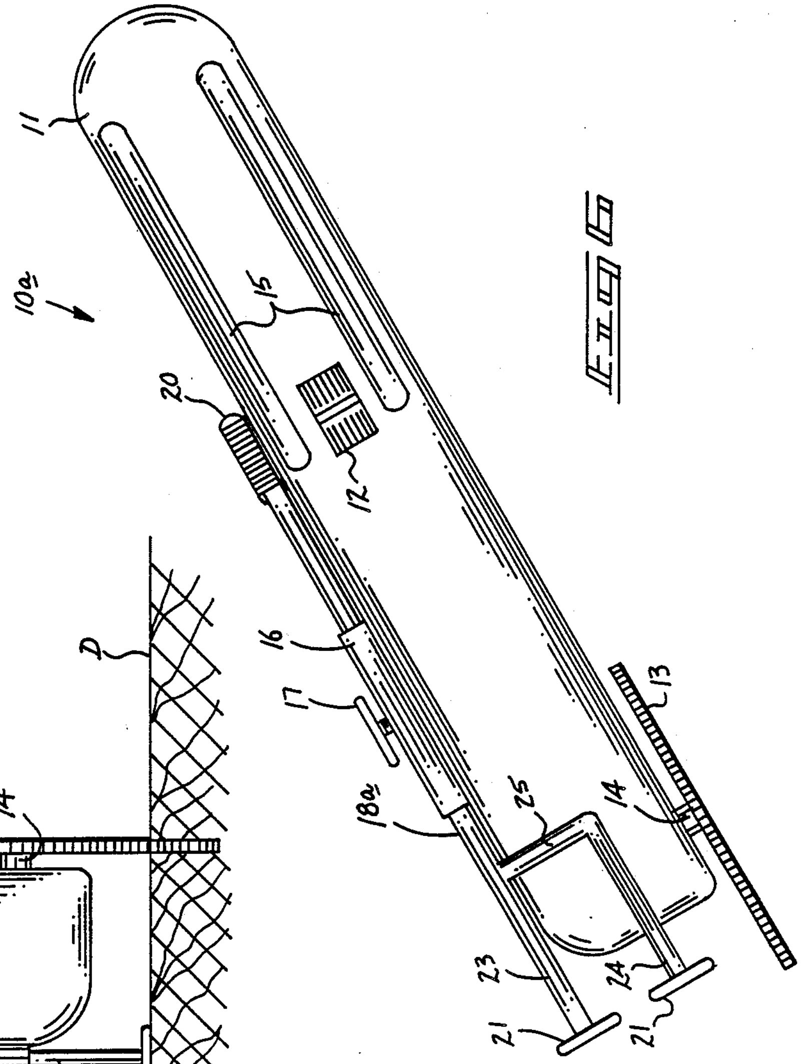
FIG. 6 is an orthographic top view of a modification of the instant invention.
Figure 7:
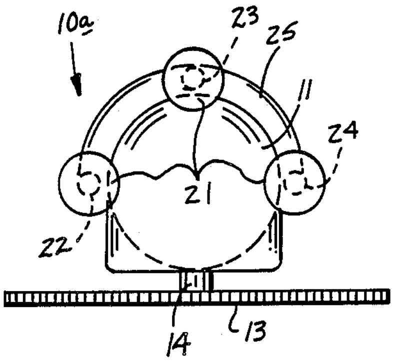
FIG. 7 is an orthographic end view taken in elevation of the instant as illustrated in FIG. 6.
Figure 8:
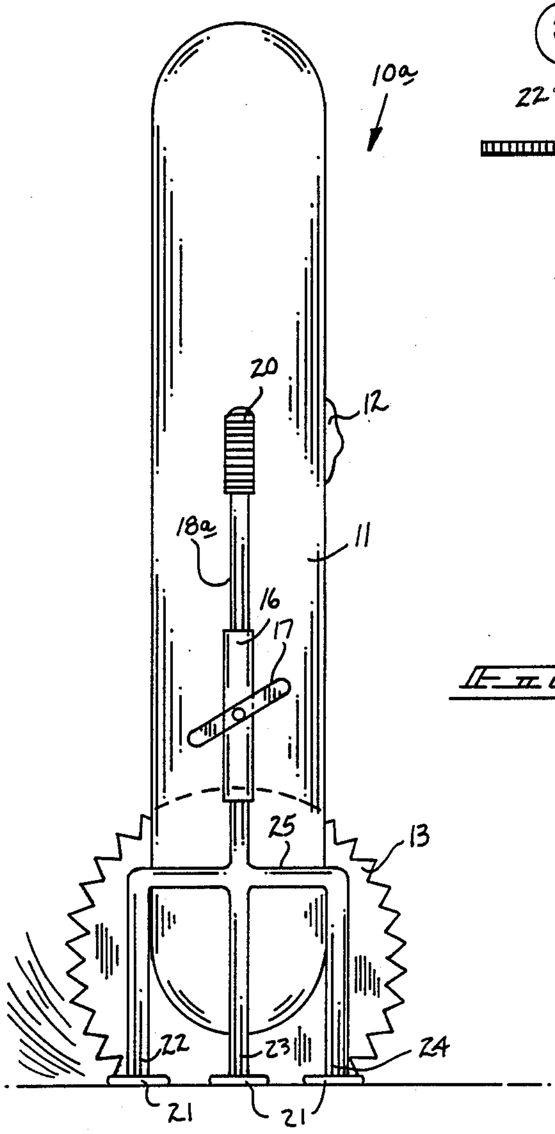
FIG. 8 is an orthographic side view of the instant invention illustrated in FIGS. 6 and 7.

FIGS. 6, 7, and 8 are illustrative of a modified drywall saw **10*a* wherein a modified rod 18*a* intersects a semi-annular support rod 25 orthogonally mounted relative to the modified rod 18*a*, and wherein the intersection of the modified rod 18*a* is medially positioned relative to the semi-annular support rod 25, wherein first, second, and third respective leg 22, 23, and 24 are symmetrically formed and orthogonally extending relative to the semi-annular support rod 25 beyond a forward end of the housing 11, wherein each of the first, second, and third legs are formed with an annular foot member 21 that is in turn orthogonally and integrally mounted to a forward end of each of the legs 22, 23, and 24. As illustrated in FIG. 7, &he legs 22, 28, and 24 are positioned in a semi-annular array about the housing 11 to provide stability to the tool when positioned adjacent a section of drywall "D", as well as providing depth of cut to ensure a proper cut, as well as stabilizing the tool minimizing potential injury to an individual grasping the tool in use. It should be further noted that the first and third legs 22 and 24 are positioned diametrically opposed to one another on opposed sides of the housing 11 with the second leg 23 positioned medially of the first and third legs and aligned with the rod 18*a* which is mounted diametrically opposed to the drive shaft 14 where it extends from the housing 11** to provide and afford maximum stability of the apparatus in use during a cutting procedure.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A portable circular saw apparatus comprising, an elongate housing defined by a central axis, and the housing including a surrounding side wall, and a circular saw orthogonally mounted to a rotatable drive shaft, the drive shaft extending through the side wall of the housing, and the circular saw positioned for rotation in a plane parallel to the axis spaced from and adjacent the side wall, and grasping ribs mounted on the side wall of the housing wherein the grasping ribs are spaced parallel relative to one another and are aligned parallel to the axis, and the ribs extend adjacent a rear end of the housing and extend forwardly to a position generally medially of the housing, and wherein the circular saw is of a diameter within a range of two to four inches to proportion the saw relative to the housing to enable ease of use by an individual in grasping of the housing during use, and including a sleeve mounted to the side wall of the housing, wherein the sleeve is aligned parallel to the axis, and the sleeve is fixedly mounted to the housing diametrically opposed to the drive shaft extending through the house, and the sleeve includes a slidable rod mounted therein, the rod including an enlarged rearend portion to prevent extraction of the sleeve through the housing, wherein the end portion is of a diameter greater than that defined by the sleeve, and positioning means mounted at a forward end of the rod, and an abutment member threadedly mounted to the sleeve to fix the rod relative to the sleeve to position the positioning means relative to the sleeve to control a depth of cut and provide relative stability of the housing during use by an individual.

2. An apparatus as set forth in claim 1 wherein the positioning means includes an annular foot member mounted to a forward end of the rod orthogonally thereto.

3. An apparatus as set forth in claim 1 wherein the positioning means includes a semi-annular support rod orthogonally mounted relative to a forward end of the rod, wherein the forward end of the rod is positioned medially of the semi-annular support rod, and the semi-annular support rod includes a first, a second, and a third leg extending orthogonally relative to the semi-annular rod and extending forwardly of a forward end of the housing, and each leg includes an annular foot member fixedly and orthogonally mounted to a forward end of each leg, and the first and third legs are positioned diametrically opposed relative to one another on opposite sides of the housing, wherein the second leg is positioned medially of the first and third leg and aligned with the rod.

* * * * *